United States Patent

Amako et al.

[11] Patent Number: 6,001,942
[45] Date of Patent: Dec. 14, 1999

[54] SILICON-CONTAINING POLYIMIDE RESIN AND SILICON-CONTAINING POLYAMIC ACID

[75] Inventors: Masaaki Amako; Haruhiko Furukawa; Yoshitsugu Morita; Hiroshi Ueki, all of Chiba Prefecture, Japan

[73] Assignee: Dow Corning Toray Silicone Co., Ltd., Tokyo, Japan

[21] Appl. No.: 09/217,075

[22] Filed: Dec. 21, 1998

[30] Foreign Application Priority Data

Dec. 25, 1997 [JP] Japan .................................. 9-367002

[51] Int. Cl.⁶ .................................................. C08G 77/04
[52] U.S. Cl. ................................. 528/10; 528/26; 528/38; 528/172; 528/173; 528/170; 528/179; 528/183; 528/185; 528/220; 528/229; 528/350; 528/353
[58] Field of Search ................................ 528/10, 38, 26, 528/353, 220, 229, 172, 173, 183, 185, 350, 170, 179

[56] References Cited

U.S. PATENT DOCUMENTS

| | | | |
|---|---|---|---|
| 4,963,635 | 10/1990 | Kunimune et al. | 528/26 |
| 5,252,703 | 10/1993 | Nakajima et al. | 525/423 |
| 5,262,506 | 11/1993 | Okawa et al. | 528/27 |
| 5,623,026 | 4/1997 | Buekers et al. | 528/26 |
| 5,747,625 | 5/1998 | Furukawa et al. | 528/20 |
| 5,866,250 | 2/1999 | Oka et al. | 528/26 |

FOREIGN PATENT DOCUMENTS 01-204931  8/1989  Japan .

*Primary Examiner*—P. Hampton-Hightower
*Attorney, Agent, or Firm*—Alex Weitz

[57] ABSTRACT

The invention relates to a silicon-containing polyimide resin comprising (I) 0.1 to 100 mole % of structural units represented by the formula:

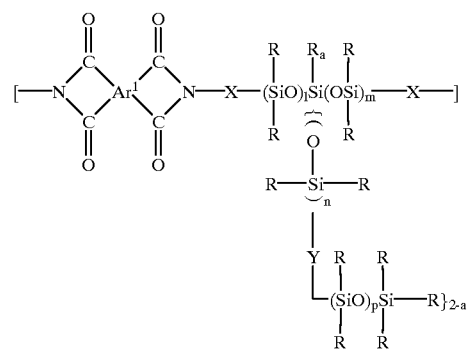

where $Ar^1$ is a tetra valent organic group having at least one aromatic ring, R independently represents a monovalent hydrocarbon group free of aliphatic unsaturated bonds, X is selected from an alkyleneoxyalkylene or an alkylene group having 2 or more carbon atoms, Y is an oxygen atom, an alkyleneoxyalkylene group, or an alkylene group having 2 or more carbon atoms, l, m, n are each integers having a value of 1 to 10, p is an integer having a value of 1 to 80, and a is 0 or 1; and (II) 99.9 to 0 mole % of structural units represented by the formula:

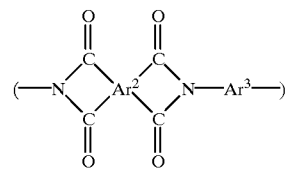

where $Ar^2$ is a tetravalent organic group having at least one aromatic ring, and $Ar^3$ is a divalent organic group having at least one aromatic group.

8 Claims, No Drawings

SILICON-CONTAINING POLYIMIDE RESIN AND SILICON-CONTAINING POLYAMIC ACID

FIELD OF THE INVENTION

The present invention relates to a silicon-containing polyimide resin and to a silicon-containing polyamic acid, in particular to a silicon-containing polyimide resin that possesses excellent water-repellant and adhesive properties, as well as to a silicon-containing polyamic acid which is used as a starting material for the manufacture of the polyimide resin.

BACKGROUND OF THE INVENTION

Polyimide resin possesses excellent mechanical characteristics and heat-resistant properties and therefore it finds wide application as a molding, film-forming, and coating material. This resin, however, is unsatisfactory from the point of view of its molding, water-repellant properties, flexibility, and solubility. It was proposed to improve the aforementioned properties by copolymerizing it with polyorganosiloxane as a soft segment having amino groups on both molecular terminals (see Japanese Laid-Open Patent Application Heisei 4-36321). It was impossible, however, to effectively improve the properties of the silicon-containing polyimide resin obtained by the aforementioned method. This is because the polyorganosiloxane as a part of the molecular skeletal structure of the silicon-containing polyimide resin has a limited degree of freedom. It was proposed to solve this problem by graft-polymerizing the polyorganosiloxane chain to the side chain of the silicon-containing polyimide resin (see Japanese Laid-Open Patent Application Heisei 1-204931). However, even in this silicon-containing polyimide resin, the polyorganosiloxane chain did not have a sufficient degree of freedom.

SUMMARY OF THE INVENTION

It is an object of the present invention to provide a silicon-containing polyimide resin which possesses excellent water-repellent properties and sealing properties, as well as to provide a polyamic acid which is used as a stating material for the production of the aforementioned polyimide resin.

The present invention, therefore, relates to a silicon-containing polyimide resin comprising 0.1 to 100 mole % of the structural units represented by the structural formula (1) given below and 99.9 to 0 mole % of the structural units represented by the structural formula (2) given below:

Structural Formula (1):

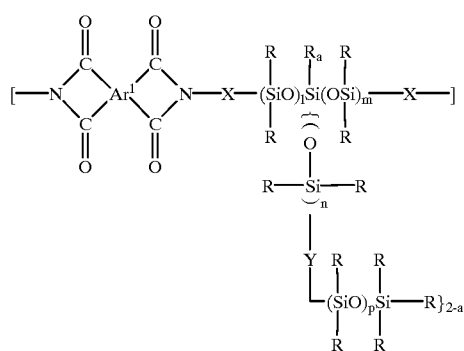

where $Ar^1$ is a four-valent organic group having at least one aromatic ring, R represents identical or different monovalent hydrocarbon groups which are free of aliphatic unsaturated bonds, X is an alkyleneoxyalkylene or an alkylene group having 2 or more carbon atoms, and Y is an oxygen atom, an alkyleneoxyalkylene group, or an alkylene group having 2 or more carbon atoms, l, m, n are integers from 1 to 10, p is an integer from 1 to 80, and a is 0 or 1.

Structural Formula (2):

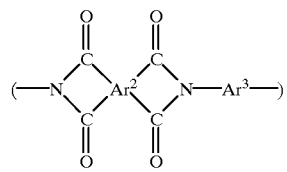

where $Ar^2$ is a four-valent organic group having at least one aromatic ring, and $Ar^3$ is a bivalent organic group having at least one aromatic group. The invention further relates to a silicon-containing polyamic acid, comprising 1 to 100 mole % of the structural units represented by the structural formula (A) given below and 99.9 to 0 mole % of structural units represented by structural formula (B) given below:

Structural Formula (A):

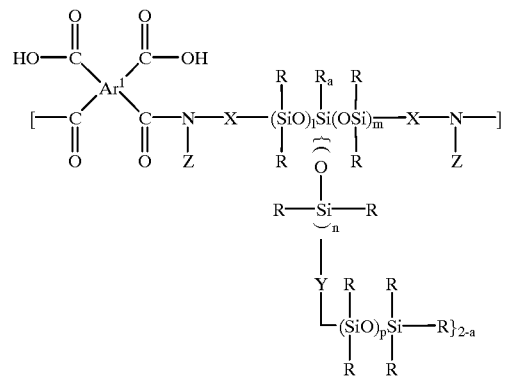

where $Ar^1$, R, X, Y, l, m, n, p, and a are the same as defined above; and Z is a hydrogen atom or —$SiR_3$ where R is the same as defined above.

Structural Formula (B):

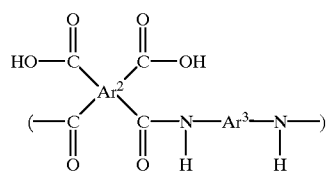

where $Ar^2$ and $Ar^3$ are the same as defined above.

DETAILED DESCRIPTION OF THE INVENTION

The silicon-containing resin of the present invention is composed of the structural units represented by the structural formulae (1) and (2) given below:

Structural Formula (1):
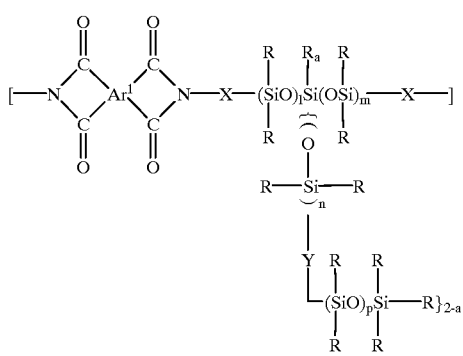
Structural Formula (2):
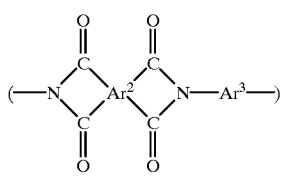
Where Ar$^1$ and Ar$^2$ are four-valent organic groups having at least one aromatic ring. The following are examples of the of the aforementioned groups:
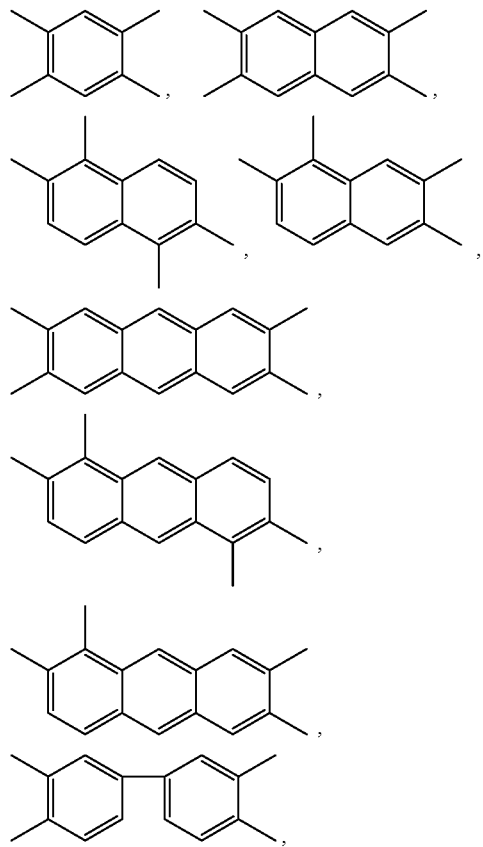
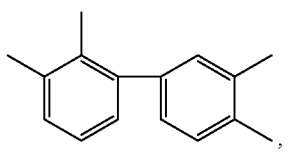,
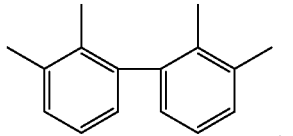,
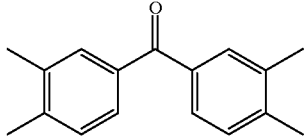,
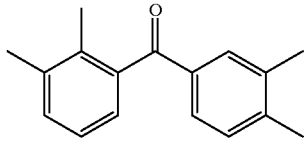,
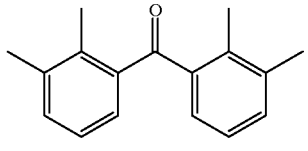,
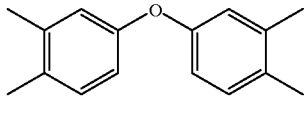,
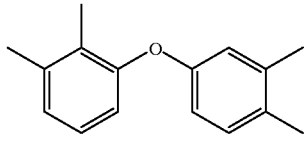,
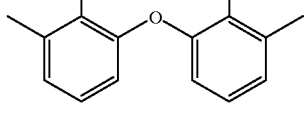,
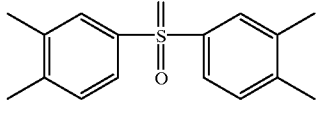,
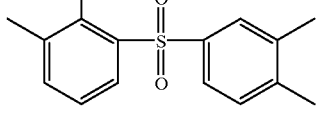,
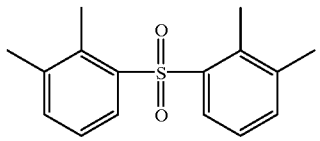,
,
,

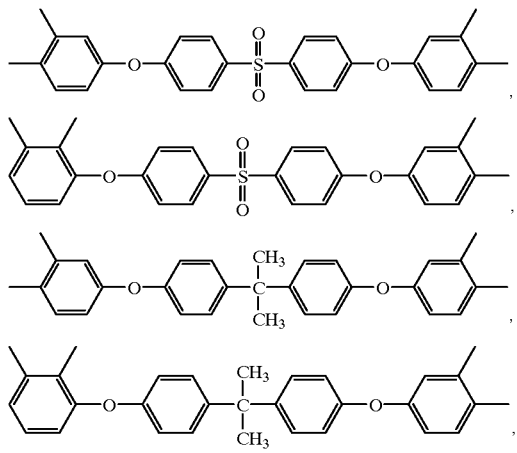
Among the above, the following groups are preferable:
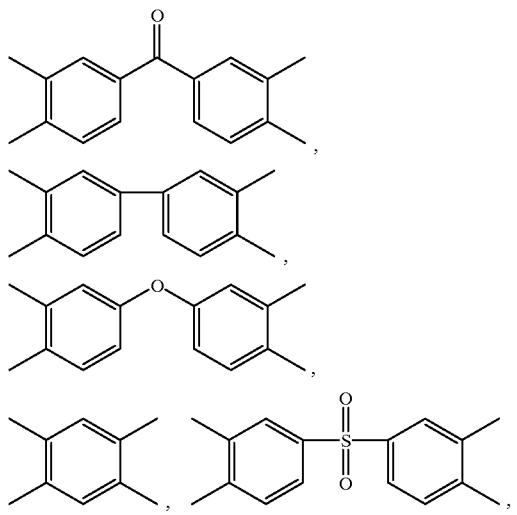
Ar³ in formula (2) represents a bivalent group having at least one aromatic ring. The following are examples of these groups:
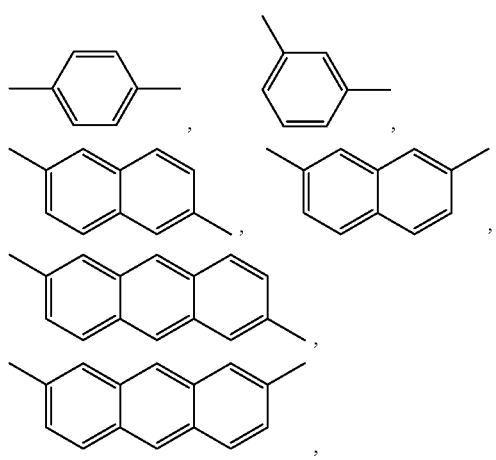
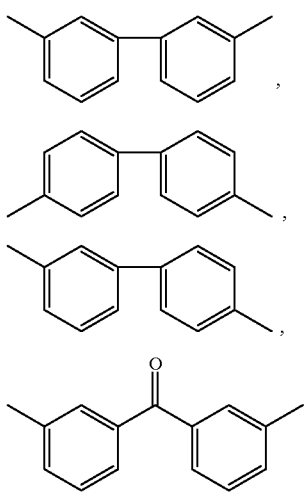
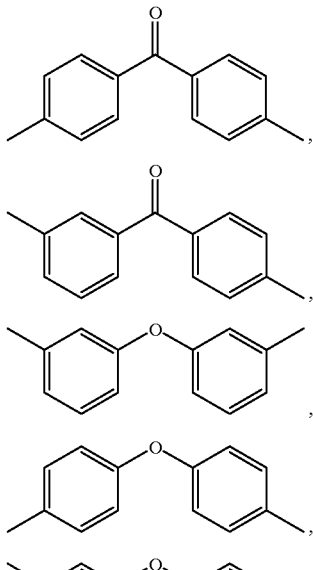
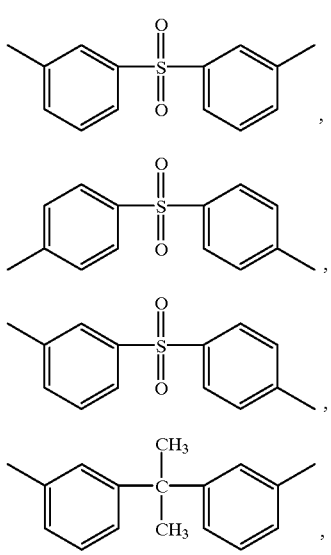

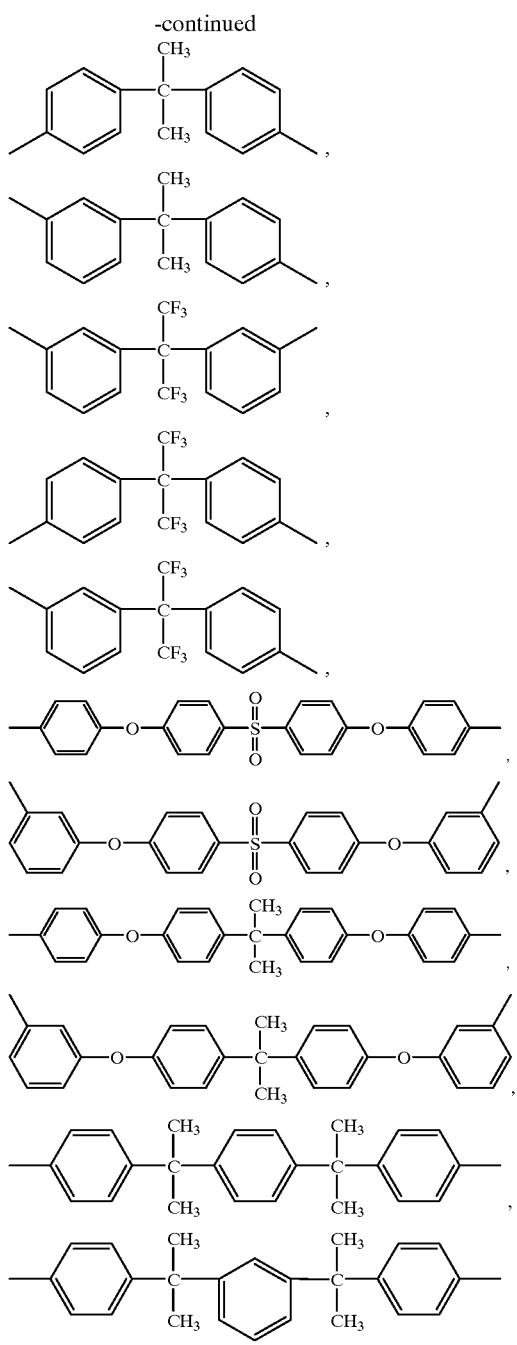

Among the above groups, the following are preferable:

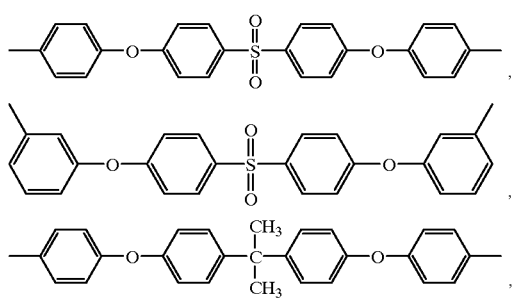

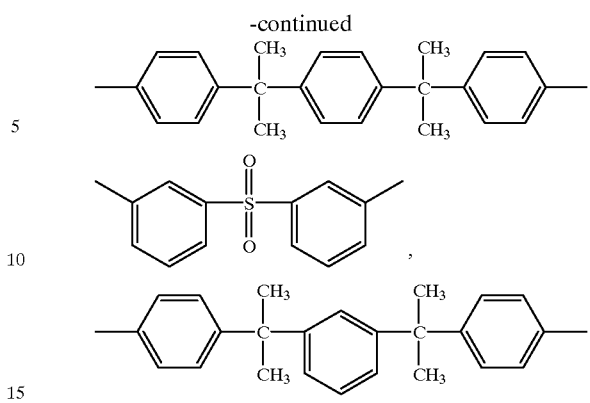

R in formula (1) represents monovalent hydrocarbon groups which may be the same or different and which are free of aliphatic unsaturated bounds. The following are specific examples of these groups: methyl groups, ethyl groups, propyl groups, butyl group, pentyl groups, hexyl groups, or similar alkyl groups; phenyl groups, tolyl groups, xylyl groups, or similar aryl groups; benzyl group, phenethyl groups, or similar arylalkyl groups. X is an alkylenoxyalkylene group or an alkylene group having 2 or more carbon atoms. The following are specific examples of these groups: ethylene groups, propylene groups, butylene groups, pentylene groups, hexylene groups, ethylenoxypropylene groups, and ethylenoxybutylene groups. Y is an oxygen atom, an alkylenoxyalkylene group, or an alkylene group with 2 or more carbon atoms; the alkylene group and the alkylenoxyalkylene are preferable for use as X. Symbols l, m, and n designate integers from 1 to 10, but integers from 1 to 5 are preferable. Symbol p designates an integer from 1 to 80, preferably from 1 to 60. If p exceeds 80, miscibility of starting materials used in the production silicon-containing polyimide resins will be impaired, and the reaction solution will acquire turbidity resulting from insufficient progress in the reaction. Since the value of p may be an average, the silicon-containing polyimide resin of the invention may constitute a mixture composed of resins having different values of p; a is 0 or 1. The aforementioned structural units are used in the silicon-containing polyimide composition of the present invention in the following ratios: (structural units represented by structural formula (1)): (structural units represented by structural formula (2))=(0.1 to 100): (99.9 to 0) mole %, preferably (1 to 100): (99 to 0) mole %. Furthermore, at 25° C., the aforementioned silicon-containing polyimide can be in a solid form or in a liquid form as a solution in a solvent. In particular, its intrinsic viscosity (measured at 25° C. in an N-methylpyrrolidone solution) is normally within the range of 0.1 to 3.0 dl/g, preferably between 0.2 and 2.0 dl/g.

The silicon-containing polyimide resin of the present invention can be produced by first preparing a silicon-containing polyamic acid of the present invention having from 0.1 to 100 mole % of the structural units represented, e.g., by the structural formula (A) given below and 99.9 to 0 mole % of the structural units represented, e.g., by the structural formula (B) given below, and then subjecting the obtained polyamic acid to thermal cyclodehydration and imidization.

Structural Formula (A):

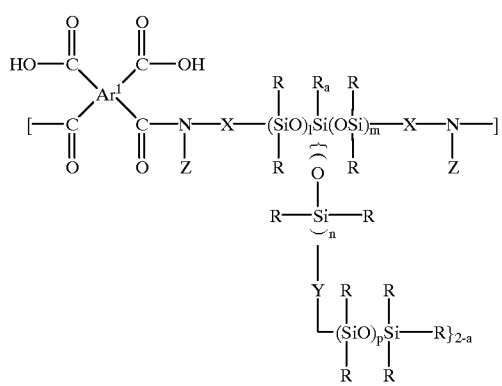

Structural Formula (B):

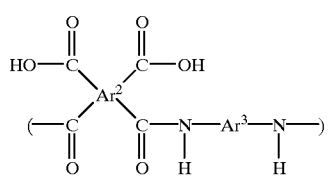

where $Ar^1$, $Ar^2$, $Ar^3$, R, X, Y, l, m, n, p, and a are the same as defined above. Z is a hydrogen atom or a silyl group represented by the following formula: —$SiR_3$ (where R is the same as defined above). Thermal cyclodehydration is a process which is carried out by applying a solution of the aforementioned polyamic acid directly onto a substrate, subjecting the coated substrate to heat treatment, and forming a film, or by adding to the aforementioned polyamic acid some water and an incompatible non-polar organic solvent, performing azeotropic dehydration, and then, after removal of the obtained water, applying the product onto a substrate and subjecting it to heat treatment. Normally, the aforementioned silicon-containing polyamic acid has an intrinsic viscosity (measured in N-methylpyrrolidone solution at 25° C.) within 0.1 to 3.0 dl/g, preferably between 0.2 to 2.0 dl/g.

The silicon-containing polyamic acid is produced by polymerizing a tetrahydroxylic acid.$2H_2O$ represented, e.g., by the chemical formula (C) given below and a bivalent amine compounds of formulae (D) and (E) given below.

Structural Formula (C):

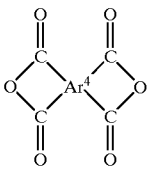

Structural Formula (D):

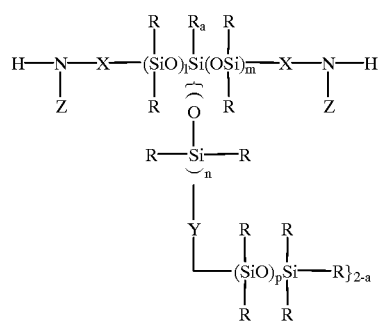

Structural Formula (E):

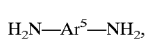

$H_2N$—$Ar^5$—$NH_2$, where $Ar^4$ is a four-valent organic group having at least one aromatic ring and are the same as the aforementioned groups $Ar^1$ and $Ar^2$. $Ar^5$ a bivalent organic group having at least one aromatic ring and is the same as the aforementioned group $Ar^3$. R, X, Y, Z l, m, n, p, and a are the same as defined above.

The tetrahydroxylic acid.$2H_2O$ of aforementioned structural formula (C) can be illustrated by the following formulae:

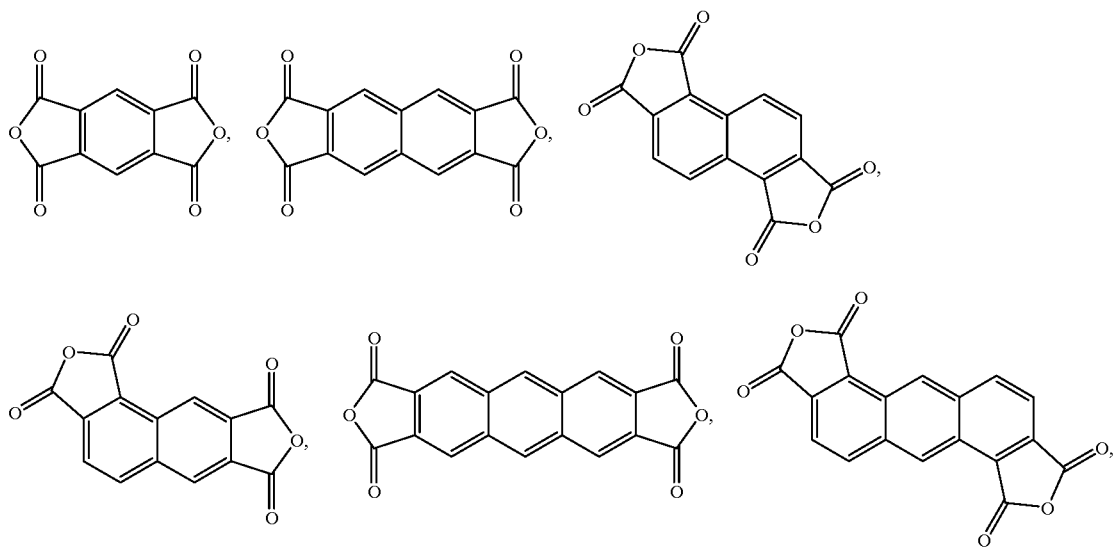

-continued
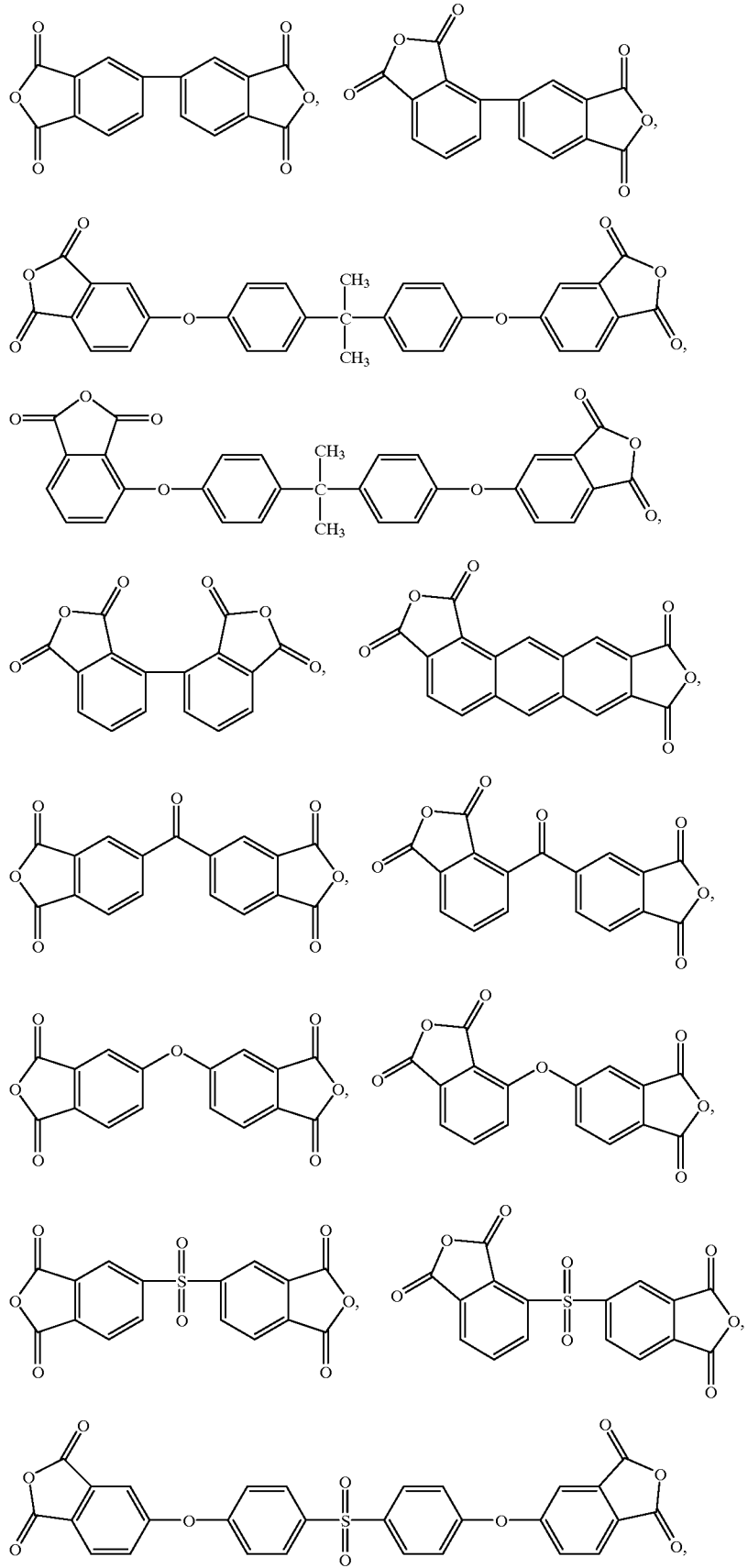

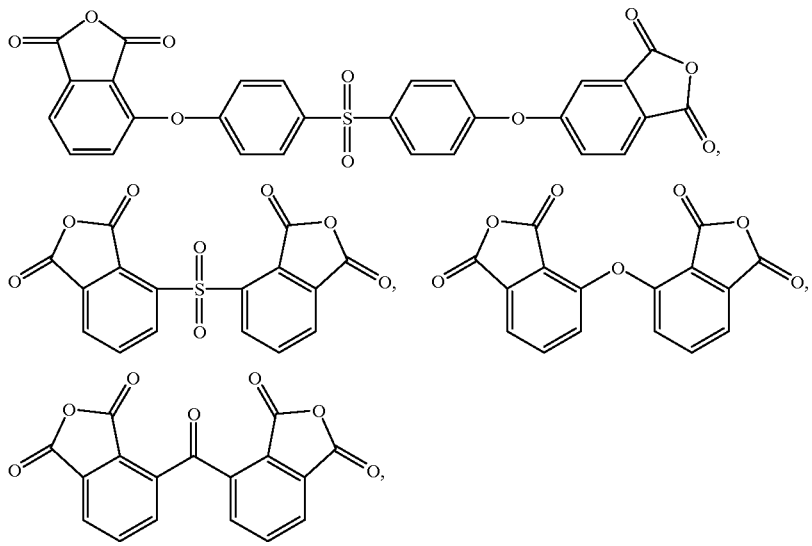

The silicone-system bivalent compound of the type expressed by aforementioned structural formulae (D) can be illustrated by the following formulae, where Me designates methyl groups, and Bu designates butyl groups:

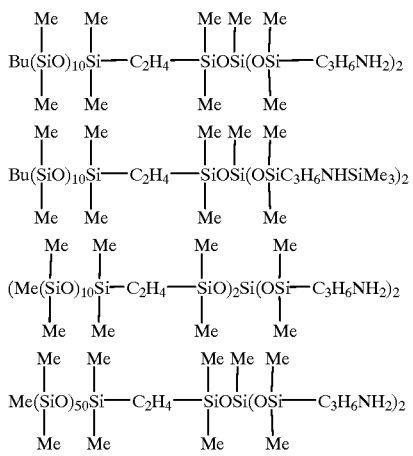

-continued

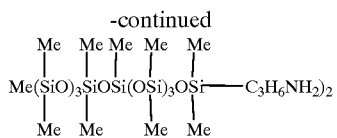

Such silicone-system bivalent compounds can be obtained, e.g., by means of a reaction of adding trimethylsilylamine to a polyorganosiloxane of formula:

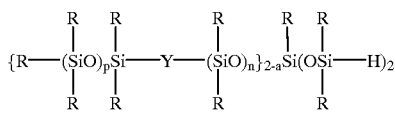

where R, y, p, n and a are the same as defined above, in the presence of a platinum catalyst, followed by detrimethylsilylation (see Japanese laid-Open Patent Application No. 4-323222).

The bivalent amine-system compound of aforementioned structural formula (E) can be illustrated by the following formulae:

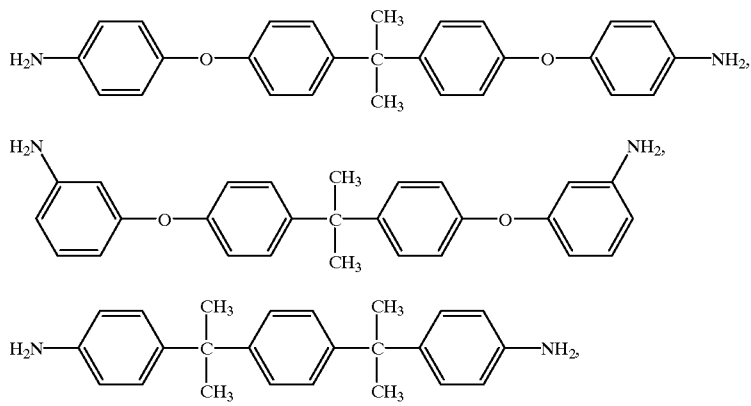

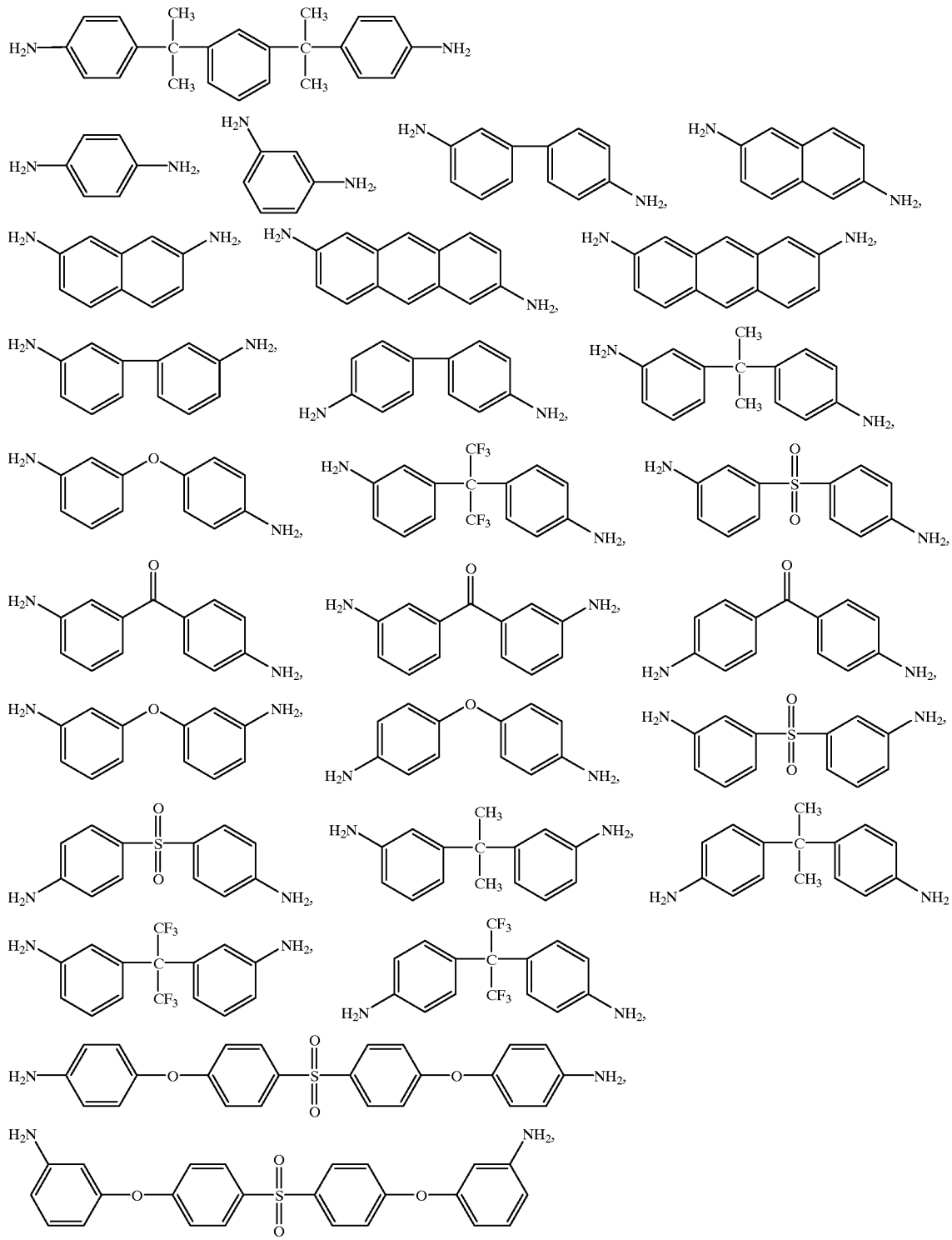

Polymerization reaction between the anhydrous tetracarboxylic acid.2H$_2$O of aforementioned structural formula (C) and the bivalent amine compounds of aforementioned structural formulae (D) and (E) can be performed by a known method. For example, a reaction between the aforementioned anhydrous tetracarboxylic acid.2H$_2$O and the bivalent amine compound can be conducted in a polar solvent under low-temperature conditions of 0 to 80° C. There are no special limitations with regard to the sequence of addition of the components. However, the best results are obtained, e.g., when the anhydrous tetracarboxylic acid.2H$_2$O is introduced into the polar solvent first, and then the silicone-system bivalent amine compound is added for reaction. The bivalent amine compound of the structural formula (E) can be introduced into the reaction system as it is or after being preliminarily dissolved in a polar solvent. A polar solvent suitable for the aforementioned reaction can be represented by N-methyl-2-pyrrolidone, N,N-dimethyl formamide, N,N-dimethylacetoamide, dimethylsulfoxide, tetrahydrofuran, or combinations of the above. When inert solvents are added, in order to improve solubility of the silicone-system bivalent amine compound, an appropriate non-polar solvent, such as toluene, xylene, etc., can also be added. Furthermore, silicone-system amine compounds represented by the following structural formula (F) can be added in amounts not detrimental for the purposes of the present invention:

Structural Formula (F):

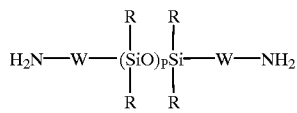

where R and p are the same as defined above, and W is a substituted or non-substituted bivalent hydrocarbon group having 2 or more carbon atoms. An anhydrous phthalic acid, such as a bivalent anhydrous carboxylic acid and aniline or similar monovalent amine compound can be used as a terminal end stopper or a molecular weight adjuster.

The aforementioned silicon-containing polyimide resin of the present invention is superior to a conventional polyimide resin with regard to mechanical and heat-resistant properties. It also possesses excellent water-repellant and adhesive characteristics, as well as solubility in solvents, plasticity, and moldability. Therefore, the silicon-containing polyimide resin of the present invention is suitable for coating, film formation, molding, and for use as an adhesive.

EXAMPLES

The invention will be further described with reference to practical examples. In these examples, all values of viscosity correspond to viscosity at 25° C.; Me designates methyl groups.

Practical Example 1

A 500 ml four-neck flask equipped with a nitrogen flow supply, a stirrer, a dripping funnel, and a thermometer was loaded with 16.11 g of anhydrous 3,3',4,4'-benzophenone tetracarboxylic acid.2H$_2$O. The contents were combined with 120 g of dried N-methylpyrrolidone and dissolved. Following this, 19.70 g of a dried silicone-system bivalent amine compound represented by the following formula:

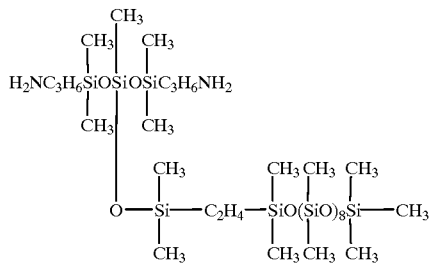

were added by dripping at room temperature. Upon completion of the dripping, the contents were stirred for I hour at room temperature and combined with a solution of 13.42 g of 2,2-bis (2-diaminophenoxyphenyl) propane in 80 g of dried N-methylpyrrolidone added by dripping while being cooled with ice water. Upon completion of the dripping, the contents were stirred for 1 hour while being cooled with ice water, and were then again stirred for 4 hours at room temperature. As a result, an N-methylpyrrolidone solution of a silicon-containing polyamic acid consisting of the structural units of structural formulae (A) and (B) given below was obtained:

Structural formula (A):

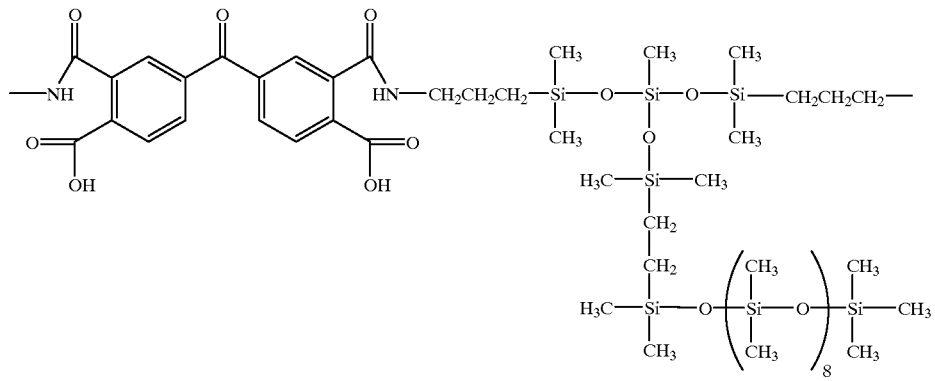

Structural Formula (B):

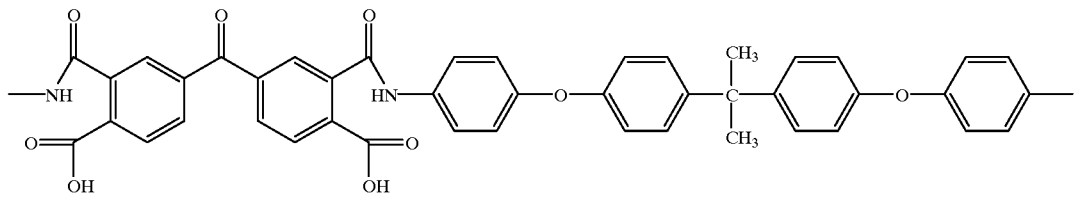

The copolymerization ratio (mole ratio) of the structural units represented by the aforementioned structural formula (A) to (B) was 35 to 65. The inherent viscosity of the obtained silicon-containing polyamic acid measured in N-methyl pyrrolidone was equal to 0.32 dl/g.

The aforementioned N-methylpyrrolidone solution of the silicon-containing polyamic acid was spread over the surface of a teflon plate, and then a film was formed by gradually heating the coated plate in a nitrogen flow at a temperature of 100° C. to 180° C. The film was peeled off from the teflon plate, transferred to a glass support and gradually heated from 200° C. to 300° C. in a nitrogen flow. As a result, a film-like silicon-containing polyimide resin consisting of the structural units represented by structural formulae (1) and (2) given below was obtained.

Structural formula (1):

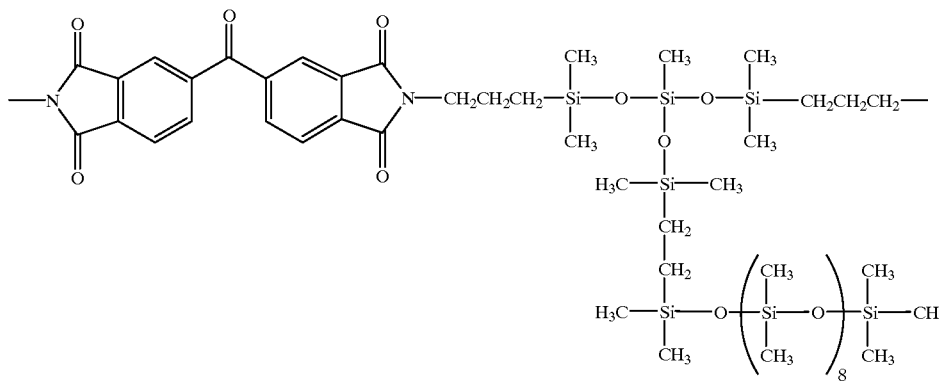

Structural Formula (2):

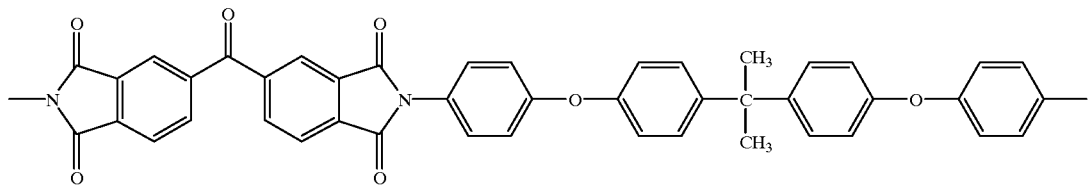

The copolymerization ratio (mole ratio) of the structural units represented by the aforementioned structural formula (1) to (2) was 35 to 65. The inherent viscosity of the obtained silicon-containing polyamic acid measured in N-methyl pyrrolidone was equal to 0.32 dl/g.

The film produced from the aforementioned silicon-containing polyimide resin was transparent and has a uniform yellowish brown color. Contact angle with water, measured by means of a contact angle measurement instrument, was 100°.

Practical Example 2

A 500 ml four-neck flask equipped with a nitrogen flow supply, a stirrer, a dripping funnel, and a thermometer was loaded with 16.11 g of anhydrous 3,3',4,4'-benzophenone tetracarboxylic acid.2H$_2$O. The contents were combined with 120 g of dried N-methylpyrrolidone and dissolved. Following this, 3.92 g of a dried silicone-system bivalent amine compound represented by the following formula:

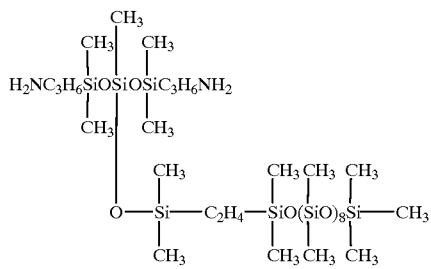

were added by dripping at room temperature. Upon completion of the dripping, the contents were stirred for 1 hour at room temperature and combined with a solution of 19.11 g of 2,2-bis (2-diaminophenoxyphenyl) propane in 80 g of dried N-methylpyrrolidone added by dripping while being cooled with ice water. Upon completion of the dripping, the contents were stirred for 1 hour while being cooled with ice water, and were then again stirred for 4 hours at room temperature. As a result, an N-methylpyrrolidone solution of a silicon-containing polyamic acid consisting of the structural units of structural formulae (A) and (B) given below was obtained:

Structural Formula (A):

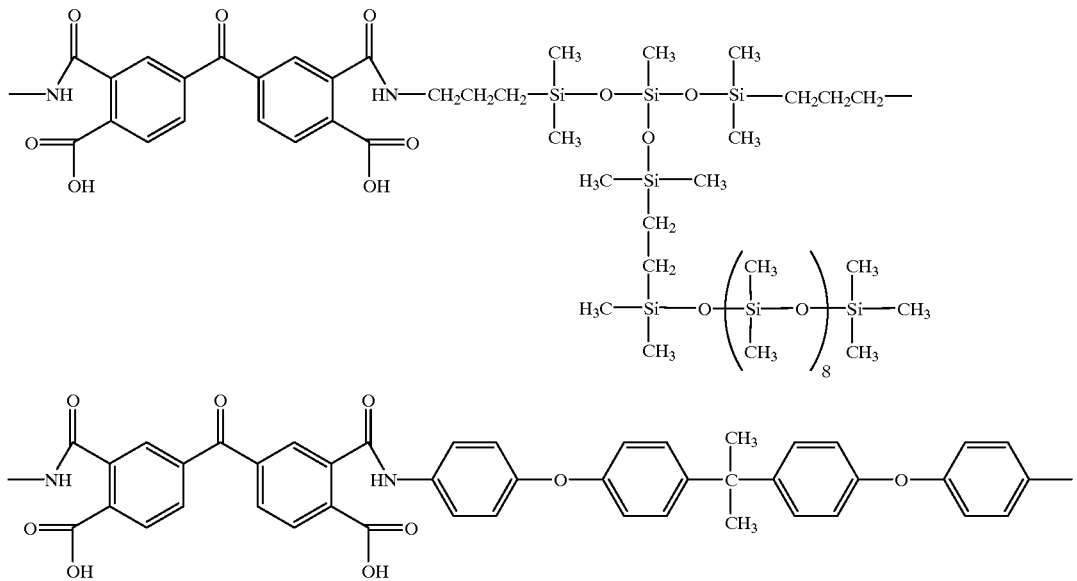

Structural Formula B

The copolymerization ratio (mole ratio) of the structural units represented by the aforementioned structural formula (A) to (B) was 7 to 93. The inherent viscosity of the obtained silicon-containing polyamic acid measured in N-methyl pyrrolidone was equal to 0.45 dl/g.

The aforementioned N-methylpyrrolidone solution of the silicon-containing polyamic acid was spread over the surface of a teflon plate, and then film was formed by gradually heating the coated plate in a nitrogen flow at a temperature of 100° C. to 180° C. The film was peeled off from the teflon plate, transferred to a glass support and gradually heated from 200° C. to 300° C. in a nitrogen flow. As a result, a film-like silicon-containing polyimide resin consisting of the structural units represented by structural formulae (1) and (2) given below was obtained.

Structural Formula (1):

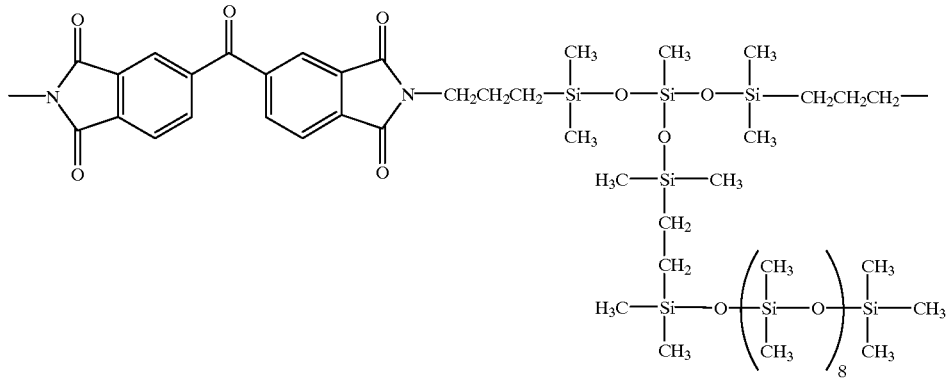

Structural Formula (2):

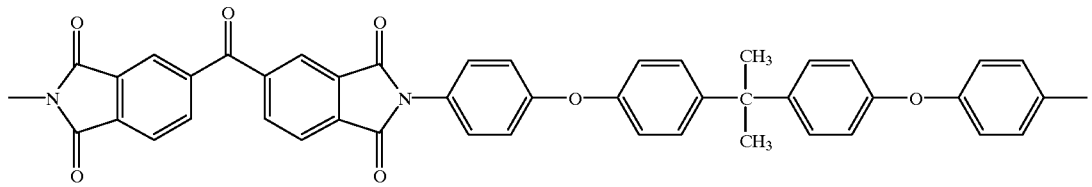

The copolymerization ratio (mole ratio) of the structural units represented by the aforementioned structural formula (1) to (2) was 7 to 93.

The contact angle with water was measured for this film-like silicon-containing polyimide resin by means of a contact angle measurement instrument, and the tensile modulus of elasticity was measured with the use of a tension tester. The silicon-containing polyimide resin film was sandwiched between two steel sheets, heated under pressure at 300 to 350° C., and thus attached to the sheets by adhesion with heating. The pasted pieces were peeled from each other on a tension tester, and their adhesion strength was measured. The measurement data is given in Table 1 which shows the results of the evaluation.

Practical Example 3

A 500 ml four-neck flask equipped with a nitrogen flow supply, a stirrer, a dripping funnel, and a thermometer was loaded with 16.11 g of anhydrous 3,3',4,4'-benzophenone tetracarboxylic acid.2H$_2$O. The contents were combined with 120 g of dried N-methylpyrrolidone and dissolved. Following this, 3.97 g of a dried silicone-system bivalent amine compound represented by the following formula:

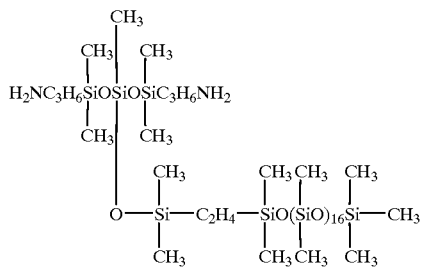

were added by dripping at room temperature. Upon completion of the dripping, the contents were stirred for 1 hour at room temperature and combined with a solution of 19.58 g of 2,2-bis (2-diaminophenoxyphenyl) propane in 80 g of dried N-methylpyrrolidone added by dripping while being cooled with ice water. Upon completion of the dripping, the contents were stirred for 1 hour while being cooled with ice water, and were then again stirred for 4 hours at room temperature. As a result, an N-methylpyrrolidone solution of a silicon-containing polyamic acid consisting of the structural units of structural formulae (A) and (B) given below was obtained:

Structural Formula (A):

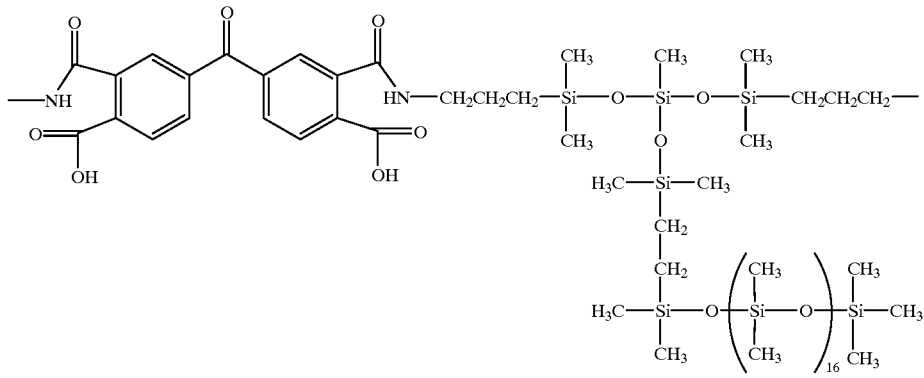

Structural Formula (B):

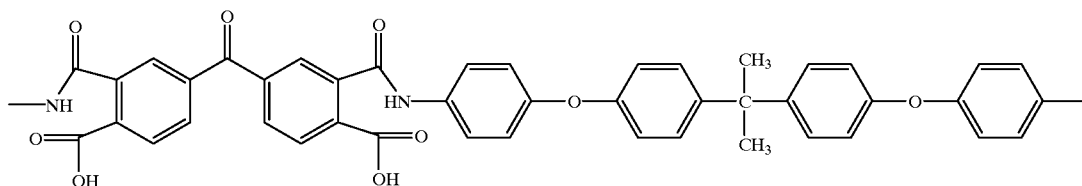

The copolymerization ratio (mole ratio) of the structural units represented by the aforementioned structural formula (A) to (B) was 5 to 95. The inherent viscosity of the obtained silicon-containing polyamic acid measured in N-methyl pyrrolidone was equal to 0.42 dl/g.

The aforementioned N-methylpyrrolidone solution of the silicon-containing polyamic acid was spread over the surface of a teflon plate, and then a film was formed by gradually heating the coated plate in a nitrogen flow at a temperature of 100° C. to 180° C. The film was peeled off from the teflon plate, transferred to a glass support and gradually heated from 200° C. to 300° C. in a nitrogen flow. As a result, a film-like silicon-containing polyimide resin consisting of the structural units represented by structural formulae (1) and (2) given below was obtained.

Structural Formula (1):

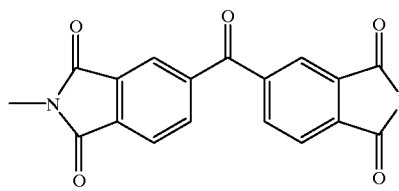 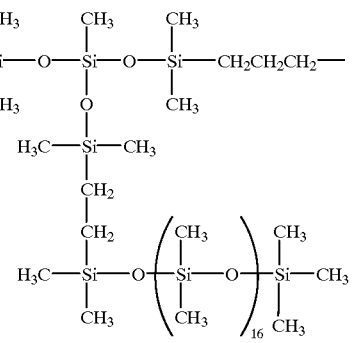

The contact angle with water, the tensile modulus of elasticity, and the adhesive strength of the obtained film-like silicon-containing polyimide resin were measured by the same methods as in Practical Example 2. The measurement data is given in Table 1 which shows the results of the evaluation.

Practical Example 4

A 500 ml four-neck flask equipped with a nitrogen flow supply, a stirrer, a dripping funnel, and a thermometer was loaded with 16.11 g of anhydrous 3,3',4,4'-benzophenone tetracarboxylic acid.2H$_2$O. The contents were combined with 120 g of dried N-methylpyrrolidone and dissolved. Following this, 3.90 g of a dried silicone-system bivalent amine compound represented by the following formula:

Structural Formula (2):

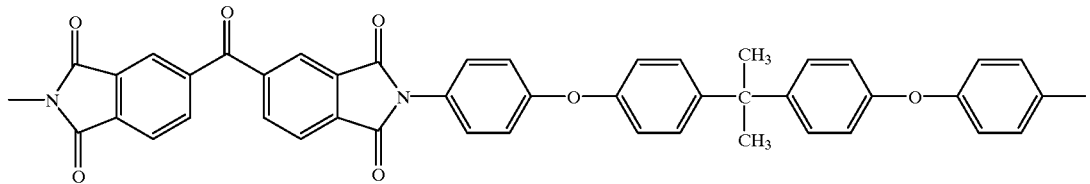

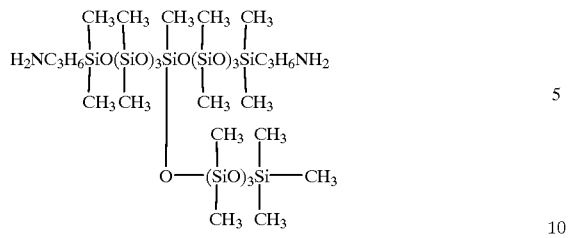

were added by dripping at room temperature. Upon completion of the dripping, the contents were stirred for 1 hour at room temperature and combined with a solution of 19.00 g of 2,2-bis (2-diaminophenoxyphenyl) propane in 80 g of dried N-methylpyrrolidone added by dripping while being cooled with ice water. Upon completion of the dripping, the contents were stirred for 1 hour while being cooled with ice water, and were then again stirred for 4 hours at room temperature. As a result, an N-methylpyrrolidone solution of a silicon-containing polyamic acid consisting of the structural units of structural formulae (A) and (B) given below was obtained:

Structural formula (A):

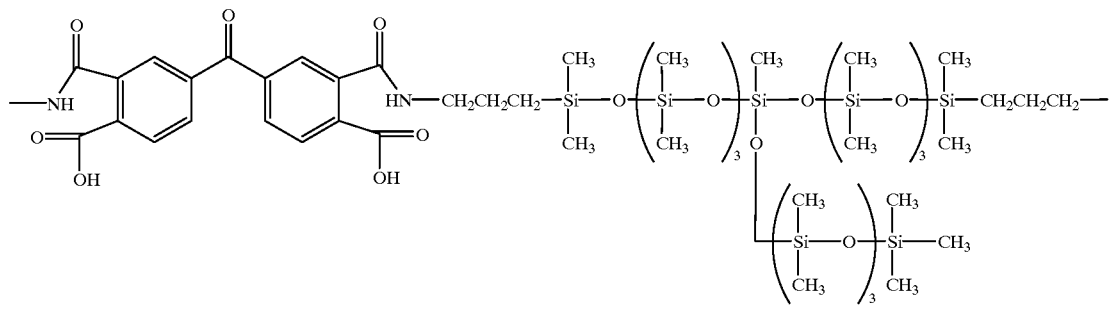

Structural Formula (B):

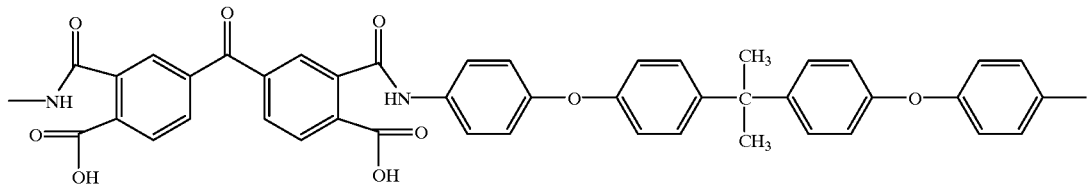

The copolymerization ratio (mole ratio) of the structural units represented by the aforementioned structural formula (A) to (B) was 7 to 93. The inherent viscosity of the obtained silicon-containing polyamic acid measured in N-methyl pyrrolidone was equal to 0.43 dl/g.

The aforementioned N-methylpyrrolidone solution of the silicon-containing polyamic acid was spread over the surface of a teflon plate, and then a film was formed by gradually heating the coated plate in a nitrogen flow at a temperature of 100° C. to 180° C. The film was peeled off from the teflon plate, transferred to a glass support and gradually heated from 200° C. to 300° C. in a nitrogen flow. As a result, a film-like silicon-containing polyimide resin consisting of the structural units represented by structural formulae (1) and (2) given below was obtained.

Structural Formula (1):

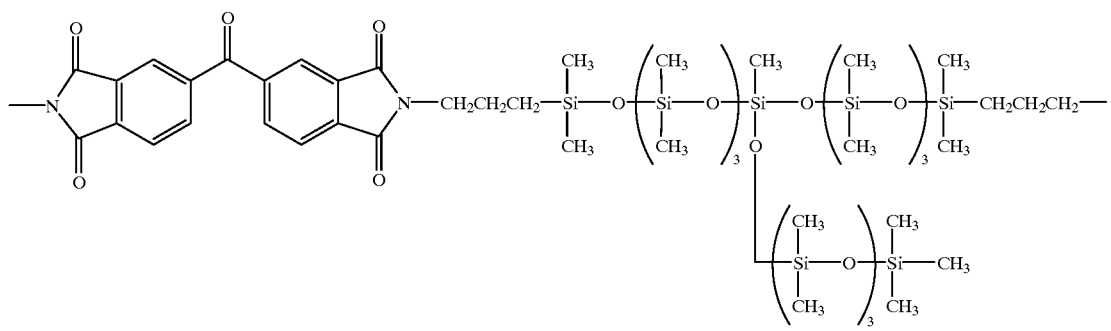

Structural Formula (2):

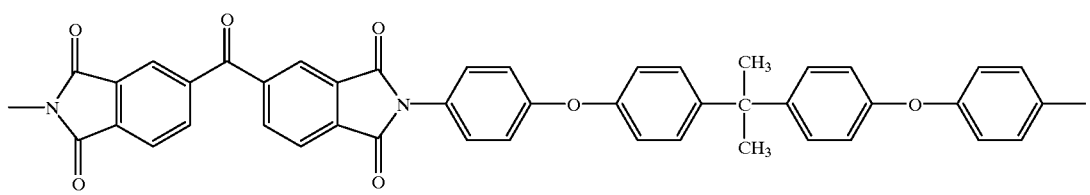

The contact angle with water, the tensile modulus of elasticity, and the adhesive strength of the obtained film-like silicon-containing polyimide resin were measured by the same methods as in Practical Example 2. The measurement data is given in Table 1 which shows the results of the evaluation.

Comparative Example 1

A 500 ml four-neck flask equipped with a nitrogen flow supply, a stirrer, a dripping funnel, and a thermometer was loaded with 16.11 g of anhydrous 3,3',4,4'-benzophenone tetracarboxylic acid.2H$_2$O. The contents were combined with 120 g of dried N-methylpyrrolidone and dissolved. Following this, 3.86 g of a dried silicone-system bivalent diamine compound represented by the following formula:

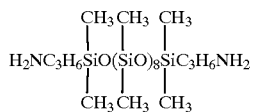

were added by dripping at room temperature. Upon completion of the dripping, the contents were stirred for 1 hour at room temperature and combined with a solution of 18.64 g of 2,2-bis (2-diaminophenoxyphenyl) propane in 80 g of dried N-methylpyrrolidone added by dripping while being cooled with ice water. Upon completion of the dripping, the contents were stirred for 1 hour while being cooled with ice water, and were then again stirred for 4 hours at room temperature. As a result, an N-methylpyrrolidone solution of a silicon-containing polyamic acid consisting of the structural units represented by structural formulae (A) and (B) given below was obtained:

Structural Formula (A):

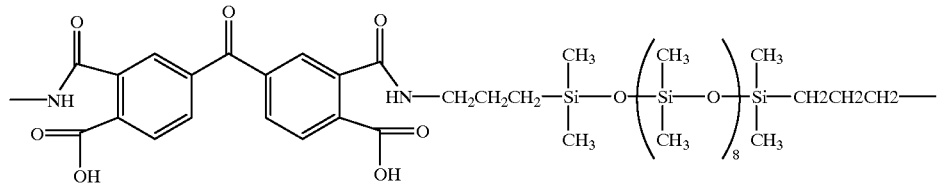

Structural Formula (B):

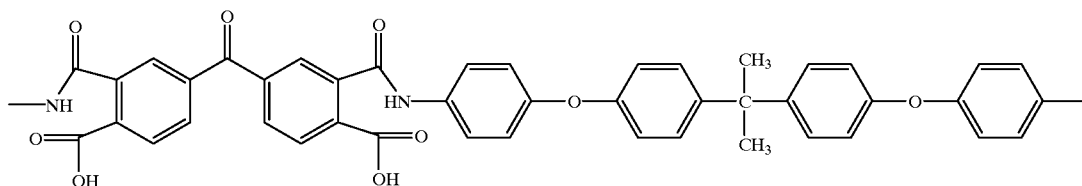

The copolymerization ratio (mole ratio) of the structural units represented by the aforementioned structural formula (A) to (B) was 9 to 91. The inherent viscosity of the obtained silicon-containing polyamic acid measured in N-methyl pyrrolidone was equal to 0.40 dl/g.

The aforementioned N-methylpyrrolidone solution of the silicon-containing polyamic acid was spread over the surface of a teflon plate, and then a film was formed by gradually heating the coated plate in a nitrogen flow at a temperature of 100° C. to 180° C. The film was peeled off from the teflon plate, transferred to a glass support and gradually heated from 200° C. to 300° C. in a nitrogen flow. As a result, a yellowish brown film-like silicon-containing polyimide resin consisting of the structural units represented by structural formulae (1) and (2) given below was obtained.

Structural Formula (1):

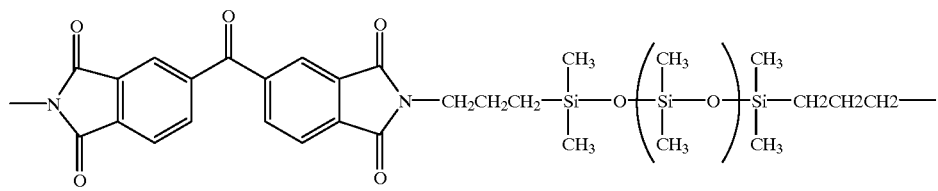

Structural Formula (2):

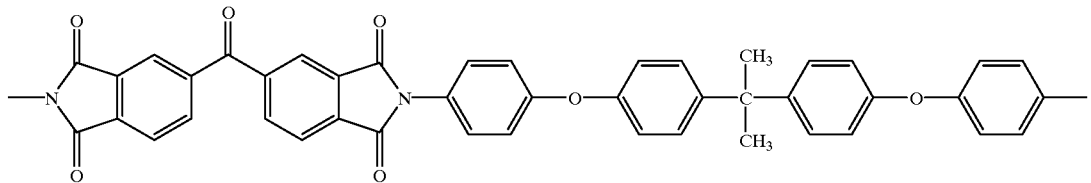

The copolymerization ratio (mole ratio) of the structural units represented by the aforementioned structural formula (1) to (2) was 9 to 91.

The contact angle with water, the tensile modulus of elasticity, and the adhesive strength of the obtained film-like silicon-containing polyimide resin were measured by the same methods as in Practical Example 2. The measurement data is given in Table 1 which shows the results of the evaluation.

Comparative Example 2

A 500 ml four-neck flask equipped with a nitrogen flow supply, a stirrer, a dripping funnel, and a thermometer was loaded with 16.11 g of anhydrous 3,3',4,4'-benzophenone tetracarboxylic acid.2H$_2$O. The contents were combined with 120 g of dried N-methylpyrrolidone and dissolved. Following this, 3.79 g of a dried silicone-system bivalent diamine compound represented by the following formula:

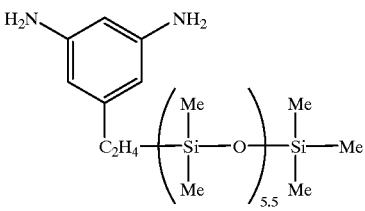

were added by dripping at room temperature. Upon completion of the dripping, the contents were stirred for 1 hour at room temperature and combined with a solution of 18.00 g of 2,2-bis (2-diaminophenoxyphenyl) propane in 80 g of dried N-methylpyrrolidone added by dripping while being cooled with ice water. Upon completion of the dripping, the contents were stirred for 1 hour while being cooled with ice water, and were then again stirred for 4 hours at room temperature. As a result, an N-methylpyrrolidone solution of a silicon-containing polyamic acid consisting of the structural units represented by structural formulae (A) and (B) given below was obtained:

Structural Formula (A):

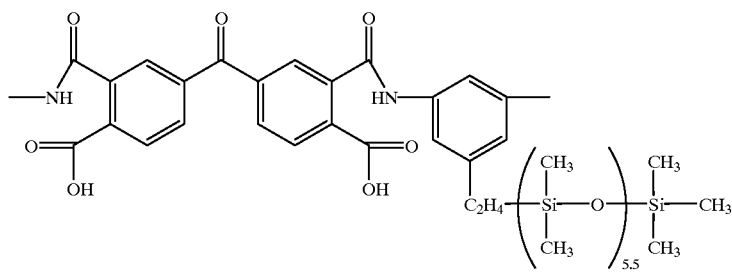

Structural Formula (B):

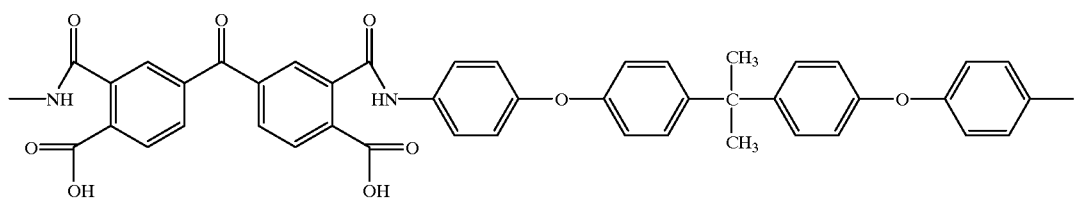

The copolymerization ratio (mole ratio) of the structural units represented by the aforementioned structural formula (A) to (B) was 12 to 88. The inherent viscosity of the obtained silicon-containing polyamic acid measured in N-methyl pyrrolidone was equal to 0.30 dl/g.

The aforementioned N-methylpyrrolidone solution of the silicon-containing polyamic acid was spread over the surface of a teflon plate, and then film was formed by gradually heating the coated plate in a nitrogen flow at a temperature of 100° C. to 180° C. The film was peeled off from the teflon plate, transferred to a glass support and gradually heated from 200° C. to 300° C. in a nitrogen flow. As a result, a yellowish brown film-like silicon-containing polyimide resin consisting of the structural units represented by structural formulae (1) and (2) given below was obtained.

Structural formula (1):

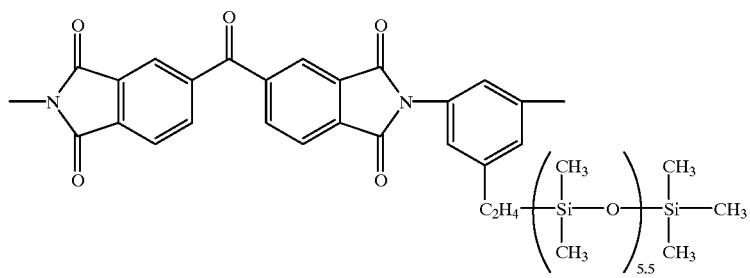

Structural Formula (2):

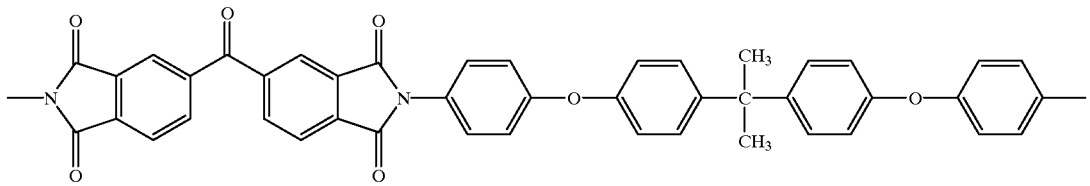

The copolymerization ratio (mole ratio) of the structural units represented by the aforementioned structural formulae (1) to (2) was 12 to 88.

The contact angle with water, the tensile modulus of elasticity, and the adhesive strength of the obtained film-like silicon-containing polyimide resin were measured by the same methods as in Practical Example 2. The measurement data is given in Table 1 which shows the results of the evaluation.

Comparative Example 3

A 500 ml four-neck flask equipped with a nitrogen flow supply, a stirrer, a dripping funnel, and a thermometer was loaded with 16.11 g of anhydrous 3,3',4,4'-benzophenone tetracarboxylic acid.2H$_2$O. The contents were combined with 120 g of dried N-methylpyrrolidone and dissolved. Following this, 4.06 g of a dried silicone-system bivalent diamine compound represented by the following formula:

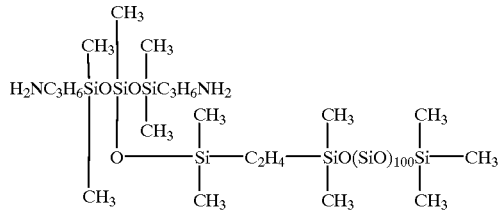

were added by dripping at room temperature. Upon completion of the dripping, the contents were stirred for 1 hour at room temperature and combined with a solution of 20.32 g of 3-aminophenylsulfone in 80 g of dried N-methylpyrrolidone added by dripping while being cooled with ice water. Upon completion of the dripping, the contents were stirred for 1 hour while being cooled with ice water, and were then again stirred for 4 hours at room temperature. As a result, an N-methylpyrrolidone solution of a silicon-containing polyamic acid consisting of the structural units represented by structural formulae (A) and (B) given below was obtained:

Structural Formula (A):

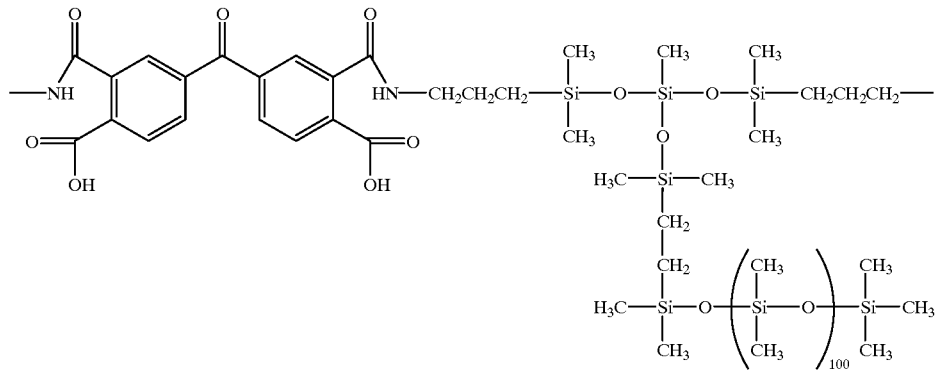

Structural Formula (B):

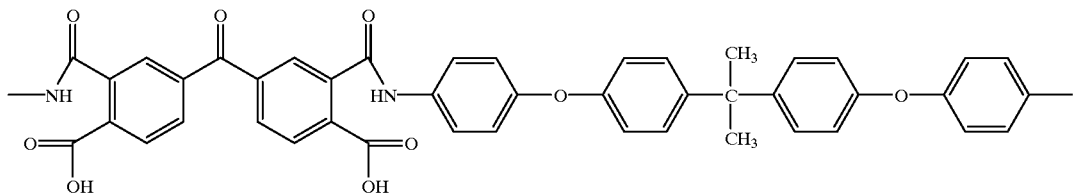

The copolymerization ratio (mole ratio) of the structural units represented by the aforementioned structural formula (A) to (B) was 1 to 99. The inherent viscosity of the obtained silicon-containing polyamic acid measured in N-methyl pyrrolidone was equal to 0.23 dl/g.

The aforementioned N-methylpyrrolidone solution of the silicon-containing polyamic acid was spread over the surface of a teflon plate, and then a film was formed by gradually heating the coated plate in a nitrogen flow at a temperature of 100° C. to 300° C. The film was peeled off from the teflon plate, transferred to a glass support and gradually heated from 200° C. to 300° C. in a nitrogen flow. As a result, a yellowish brown film-like silicon-containing polyimide resin consisting of the structural units represented by structural formulae (1) and (2) given below was obtained.
Structural Formula (1):

The copolymerization ratio (mole ratio) of the structural units represented by the aforementioned structural formulae (1) to (2) was 1 to 99.

The contact angle with water, the tensile modulus of elasticity, and the adhesive strength of the obtained film-like silicon-containing polyimide resin were measured by the same methods as in Practical Example 2. The measurement data is given in Table 1 which shows the results of the evaluation.

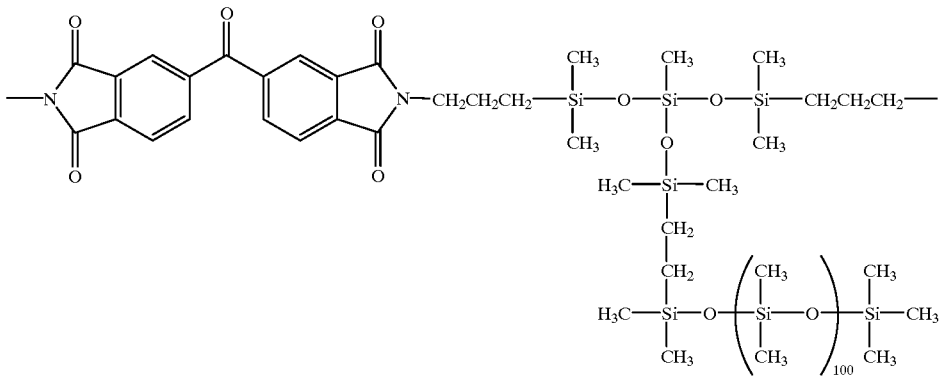

Structural Formula (2):

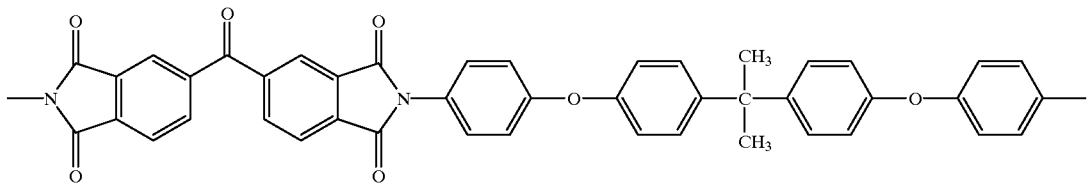

60

TABLE 1

|  | Contact Angle (degree) | Appearance of the Polyamic Acid Solution | Appearance of the Polyimide | Modulus of Elasticity (kg/mm$^2$) | Adhesive Strength (kg/mm$^2$) |
| --- | --- | --- | --- | --- | --- |
| Pr. Ex. 2 | 105 | Transparent, uniform yellowish brown color | Transparent, uniform yellowish brown color | 200 | 100 |
| Pr. Ex. 3 | 105 | Transparent, uniform yellowish brown color | Transparent, uniform yellowish brown color | 190 | 100 |
| Pr. Ex. 4 | 105 | Transparent, uniform yellowish brown color | Transparent, uniform yellowish brown color | 200 | 100 |
| Comp. Ex. 1 | 95 | Transparent, uniform yellowish brown color | Transparent, uniform yellowish brown color | 210 | 80 |
| Comp. Ex. 2 | 100 | Transparent, uniform yellowish brown color | Transparent, uniform yellowish brown color | 250 | 70 |
| Comp. Ex. 3 | — | Yellowish color, white turbidity, non-uniform | Yellowish color, white turbidity, non-uniform, the surface is sticky by touch | 150 | 10 |

From the above table, it is seen that the resins of the present invention have a greater water repellency (i.e., water, contact angle) and improved adhesion relative to the comparative examples.

That which is claimed is:

1. A silicon-containing polyimide resin comprising (I) 0.1 to 100 mole % of structural units represented by the formula:

Structural Formula (1):

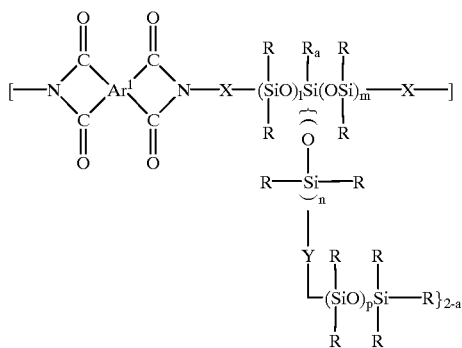

where $Ar^1$ is a tetravalent organic group having at least one aromatic ring, R independently represents a monovalent hydrocarbon group free of aliphatic unsaturated bonds, X is selected from an alkyleneoxyalkylene group having 2 or more carbon atoms or an alkylene group having 2 or more carbon atoms, Y is selected from an oxygen atom, an alkyleneoxyalkylene group having 2 or more carbon atoms, or an alkylene group having 2 or more carbon atoms, l, m, n are each integers having a value of 1 to 10, p is an integer having a value of 1 to 80, and a is 0 or 1; and (II) 99.9 to 0 mole % of structural units represented by the formula:

Structural Formula (2):

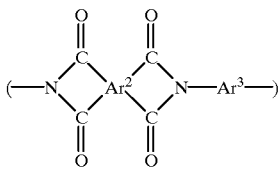

where $Ar^2$ is a tetravalent organic group having at least one aromatic ring, and $Ar^3$ is a divalent organic group having at least one aromatic group.

2. A silicon-containing polyimide resin according to claim 1, wherein $Ar^1$ and $Ar^2$ are independently selected from the following organic groups:

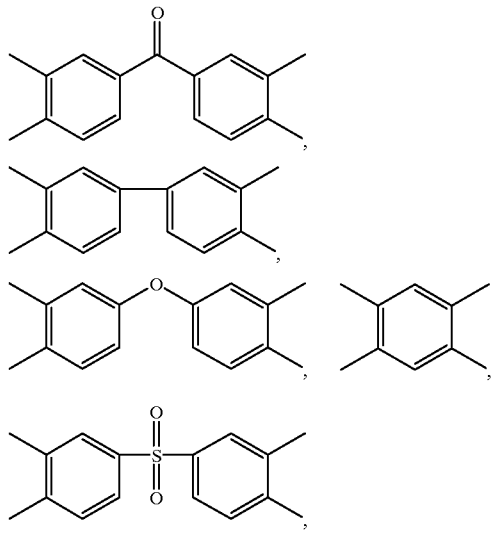

and wherein $Ar^3$ is selected from the following organic groups:

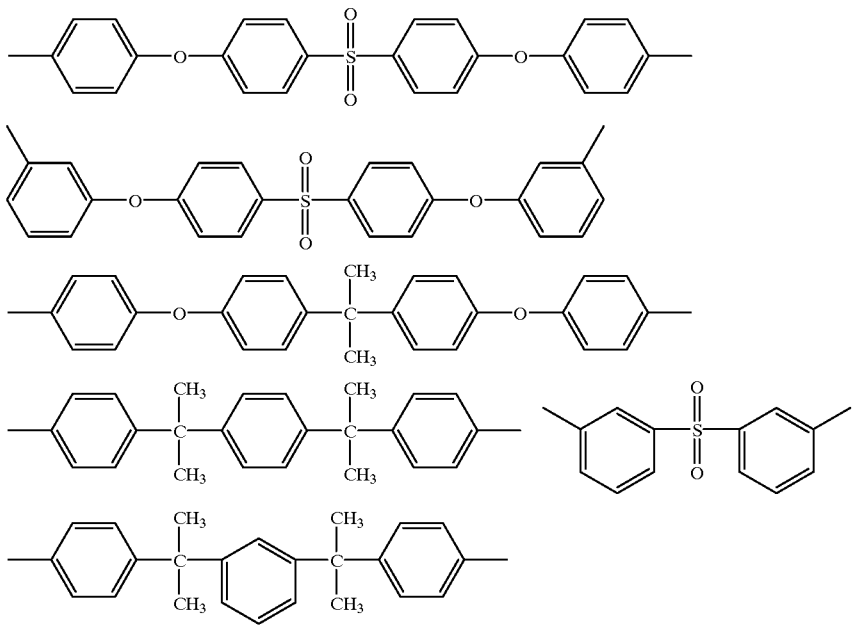

3. A silicon-containing polyamic acid comprising (A) 0.1 to 100 mole % of structural units represented by the formula:

Structural Formula (A):

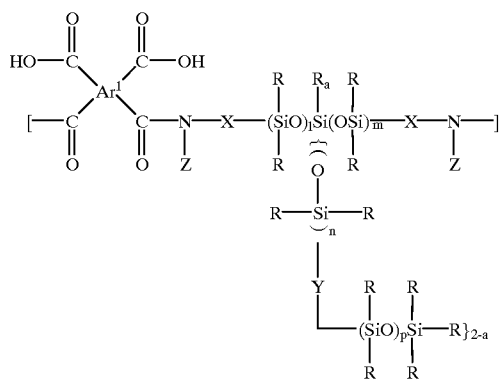

where $Ar^1$ is a tetravalent organic group having at least one aromatic ring, R independently represents a monovalent hydrocarbon group free of aliphatic unsaturated bonds, X is selected from an alkyleneoxyalkylene group having 2 or more carbon atoms or an alkylene group having 2 or more carbon atoms, and Y is selected from an oxygen atom, an alkyleneoxyalkylene group having 2 or more carbon atoms, or an alkylene group having 2 or more carbon atoms, Z is selected from a hydrogen atom or a silyl group represented by the formula —$SiR_3$ where R is the same as defined above, l, m, n are each integers having a value of 1 to 10, p is an integer having a value of 1 to 80, and a is 0 or 1; and (B) 99.9 to 0 mole % of structural units represented by the formula:

Structural Formula (B):

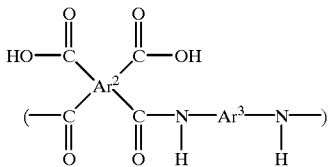

where $Ar^2$ is a tetravalent organic group having at least one aromatic ring, and $Ar^3$ is a divalent organic group having at least one aromatic group.

4. A silicon-containing polyamic acid according to claim 3, wherein $Ar^1$ and $Ar^2$ independently selected from the following organic groups

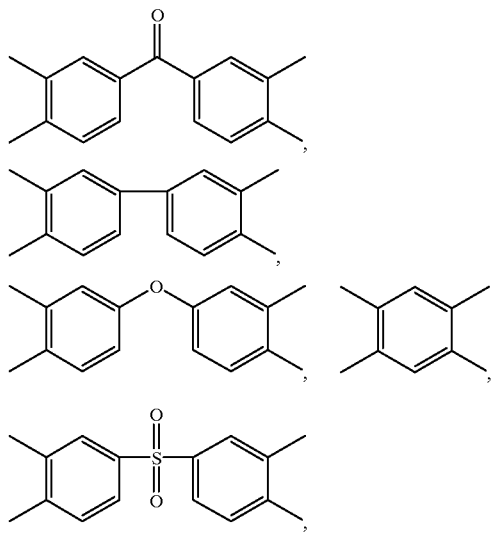

and wherein Ar³ is selected from divalent organic groups represented by the formulae

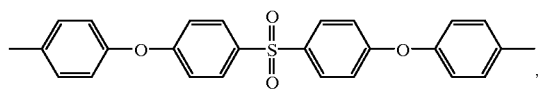,

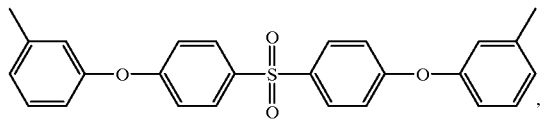,

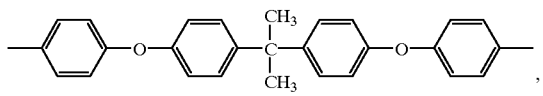,

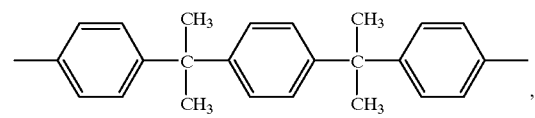,

-continued

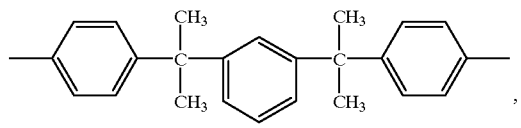,

5. A silicon-containing polyimide resin according to claim 1, wherein R is methyl.

6. A silicon-containing polyimide resin according to claim 2, wherein R is methyl.

7. A silicon-containing polyamic acid according to claim 3, wherein R is methyl.

8. A silicon-containing polyamic acid according to claim 4, wherein R is methyl.

* * * * *